US011816763B2

(12) United States Patent
Bal et al.

(10) Patent No.: US 11,816,763 B2
(45) Date of Patent: Nov. 14, 2023

(54) 3D SCATTER DISTRIBUTION ESTIMATION

(71) Applicant: Siemens Medical Solutions USA, Inc., Malvern, PA (US)

(72) Inventors: Harshali Bal, Knoxville, TN (US); Vladimir Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 463 days.

(21) Appl. No.: 17/302,240

(22) Filed: Apr. 28, 2021

(65) Prior Publication Data
US 2022/0351430 A1 Nov. 3, 2022

(51) Int. Cl.
*G06T 11/00* (2006.01)
*G01T 1/29* (2006.01)

(52) U.S. Cl.
CPC .......... *G06T 11/005* (2013.01); *G01T 1/2985* (2013.01); *G06T 2210/41* (2013.01)

(58) Field of Classification Search
CPC .............. G06T 11/005; G06T 2210/41; G06T 2211/452; G06T 11/006; G06T 2211/421; G01T 1/2985; A61B 6/037; A61B 6/481; A61B 6/483
See application file for complete search history.

(56) References Cited

U.S. PATENT DOCUMENTS

| 8,265,365 | B2 | 9/2012 | Panin | |
|---|---|---|---|---|
| 10,542,956 | B2* | 1/2020 | Berker | .................. A61B 5/055 |
| 2012/0070050 | A1* | 3/2012 | Panin | ................... G06T 11/005 |
| | | | | 382/131 |
| 2014/0003689 | A1* | 1/2014 | Asma | ................... G06T 11/006 |
| | | | | 382/131 |

FOREIGN PATENT DOCUMENTS

CN 107137102 A * 9/2017 ............. A61B 6/037

OTHER PUBLICATIONS

Latrou et al, Comparison of two 3D implementations of TOF Scatter Estimation in 3D PET, IEEE Nuclear Science Symposium Conference Record (Year: 2007).*
Watson, New, Faster, Image-Based Scatter Correction for 3D PET, IEEE Transactions on Nuclear Science, vol. 47, No. 4, Aug. (Year: 2000).*
Watson, C.C. "New, Faster, Image-Based Scatter Correction for 3D PET", IEEE Transactions on Nuclear Science, vol. 47, No. 4, Aug. 2000, (pp. 1587-1594, 8 total pages).

* cited by examiner

Primary Examiner — Ping Y Hsieh
Assistant Examiner — Xiao Liu

(57) ABSTRACT

Systems and methods to estimate 3D TOF scatter include acquisition of 3D TOF data, determination of 2D TOF data from the first TOF data, determination of first estimated scatter based on the second TOF data, reconstruction of a first estimated image based on the first estimated scatter and the second TOF data, determination of attenuated unscattered true coincidences based on the first estimated image, determination of second estimated scatter based on the first TOF data and the attenuated unscattered true coincidences, and reconstruction of an image of the object based on the first TOF data and the second estimated scatter.

19 Claims, 9 Drawing Sheets

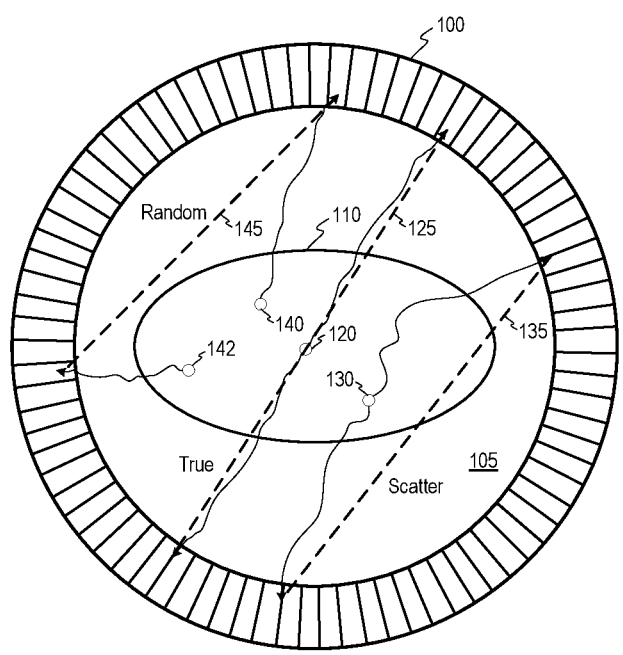 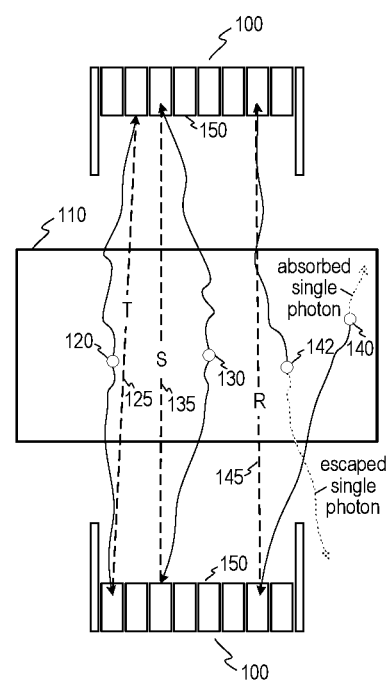
FIG. 1A  FIG. 1B

3D SCATTER DISTRIBUTION ESTIMATION

BACKGROUND

According to conventional positron-emission-tomography (PET) imaging, a radiopharmaceutical tracer is introduced into a patient body, typically via radial arterial injection. Radioactive decay of the tracer generates positrons which eventually encounter electrons and are annihilated thereby. Annihilation produces two photons which travel in approximately opposite directions.

A ring of detectors surrounding the body detects the emitted photons, identifies "coincidences", and reconstructs PET images based on the identified coincidences. A coincidence is identified when two detectors disposed on opposite sides of the body detect the arrival of two photons within a particular coincidence time window. Because the two "coincident" photons travel in approximately opposite directions, the locations of the two detectors determine a Line-of-Response (LOR) along which an annihilation event may have occurred.

A "true" coincidence represents the detection of two coincident photons which arose from a single annihilation event located on a LOR between the two detectors. A "random" coincidence represents two coincident photons which did not arise from the same annihilation event. A "scatter" coincidence is a type of true coincidence in which two coincident photons originated from the same annihilation event but the annihilation event was not located along the LOR of the two detectors because one or both of the photons interacted and scattered within the body or media.

Conventional PET scanners detect all coincidences without regard to whether the coincidences are unscattered true, random or scattered true coincidences. Since only unscattered true coincidences represent spatial information regarding the distribution of the tracer within the body, random and scatter coincidences should be addressed prior to and/or during image reconstruction. Software and/or hardware-based approaches can be used to estimate random coincidences and to subtract the random coincidences from the detected coincidences.

Model-based approaches may be used to estimate scatter coincidences. For example, single scatter simulation (SSS) modelling is currently used to model scatter coincidences having LORs contained in direct axial planes, known as 2D scatter. Inverse single slice rebinning can then be used to duplicate the 2D scatter to corresponding oblique planes (i.e., 3D scatter). In the case of a PET scanner having a short axial range, this mapping provides a reasonable estimate of 3D scatter due to the relatively similar geometric responses within the axial and oblique planes.

These geometric responses are not similar in long axial field-of-view PET scanners, and the above-described mapping does not provide a suitable estimate of 3D scatter. Estimation of 3D scatter therefore requires accurate modelling of scatter within the oblique planes as well as within the direct planes. This modelling may be prohibitively time-consuming. Even if such modelling were performed, tail-fitting of the estimated 3D scatter for each oblique plane is also necessary in order to account for multiple scatter and scatter outside the field-of-view. In the case of patient imaging, this tail-fitting is likely to be inaccurate within the oblique planes due to low numbers of coincidences caused by high attenuation and reduced scanner efficiency.

BRIEF DESCRIPTION OF THE DRAWINGS

FIGS. 1A and 1B illustrate detection of coincidences according to some embodiments.

DETAILED DESCRIPTION

Figure 2:
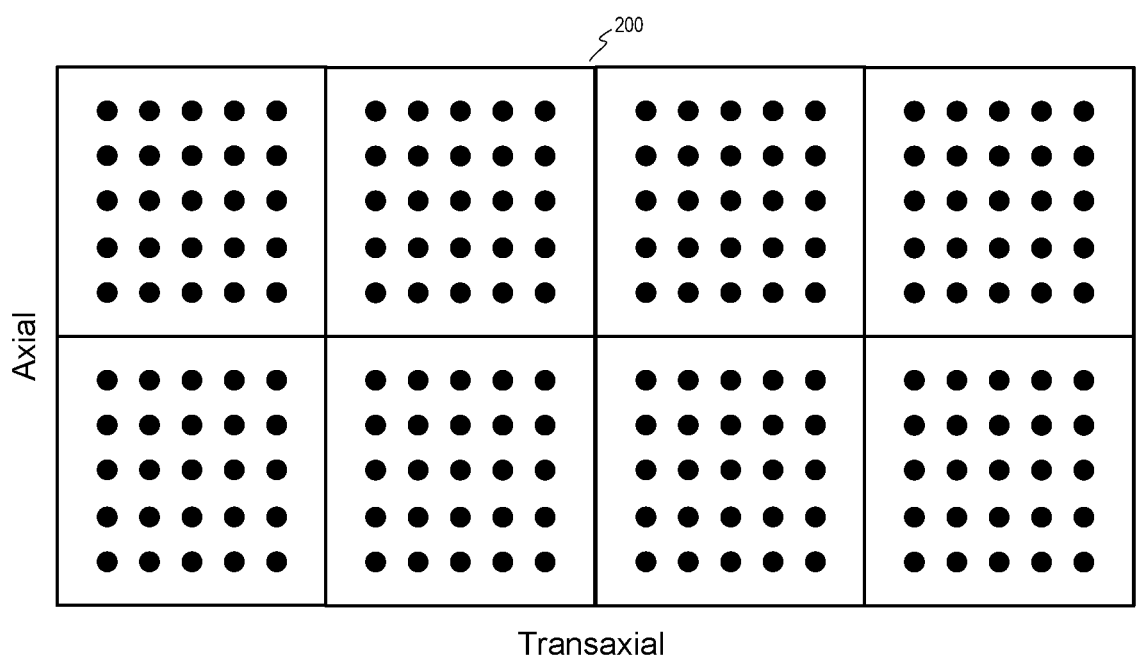
FIG. 2 illustrates a PET detector according to some embodiments.

The following description is provided to enable any person in the art to make and use the described embodiments. Various modifications will remain apparent to those in the art.

Some embodiments estimate residual 3D TOF scatter using 2D scatter estimation and use the residual 3D TOF scatter to estimate 3D scatter within 3D TOF data. Briefly, a subset of the 3D TOF data is determined, including planes associated with a 0-degree polar angle (i.e., direct axial planes) and additional oblique planes associated with low polar angles. A 2D scatter estimation is performed (e.g., using Single Scatter Simulation (SSS) with inverse single slice rebinning for the oblique planes). An "unbiased" estimated image is reconstructed based on the 3D TOF data, the 2D scatter estimate, a mean randoms estimate, attenuation correction factors, and normalization correction factors. The estimated image is then forward-projected to obtain unattenuated 3D TOF unscattered trues data.

The 3D TOF unscattered trues data is uncorrected for attenuation and the residual 3D TOF scatter is obtained by subtracting the attenuated 3D TOF unscattered trues data from the normalized net trues data (where net trues=(the original 3D TOF data−estimated mean randoms)). The residual 3D TOF scatter is then smoothed using a Gaussian filter or other advanced filtering approaches and used to reconstruct an image using the original 3D TOF data. Alternatively, 3D scatter may be determined from modelling using SSS method and fit to the residual 3D TOF scatter to obtain a 3D scatter estimate for use during image reconstruction.

Advantageously, embodiments may exploit the efficiencies of model-based 2D scatter estimation, particularly in comparison to the resource consumption required by model-based 3D scatter estimation. Embodiments also avoid tail fitting of scatter data from high polar angle planes. Moreover, the approaches described herein are based on an efficient and reliable 3D model for unscattered true coincidences instead of on a 3D scatter model.

FIG. 1A and FIG. 1B illustrate detection of coincidences according to some embodiments. FIG. 1A is an axial view of bore 105 of scanner 100 and imaging object 110 disposed therein. Imaging object 110 may comprise a human body, a phantom, or any other suitable object. FIG. 1B is a transaxial view of scanner 100 and object 110 of FIG. 1A. Scanner 100 is composed of an arbitrary number (eight in this example) of adjacent and coaxial rings of detectors 150 in the illustrated example. Each detector 150 may comprise any number of scintillator crystals and electrical transducers.

Annihilation events 120, 130, 140 and 142 are assumed to occur at various locations within object 110. As described above, an injected tracer generates positrons which are annihilated by electrons to produce two 511 keV gamma photons which travel in approximately opposite directions. Each annihilation event represented in FIG. 1A and FIG. 1A results in the detection of a coincidence. As also noted above, true coincidences represent valid image data, while scatter and random coincidences represent noise.

A coincidence is detected when a pair of detectors receive two gamma photons within the coincidence time window, as determined based on the calculated arrival times of the two gamma photons at their respective detectors. Event 120 is associated with a true coincidence because event 120 resulted in two gamma photons which were received within the coincidence time window and because the position of annihilation event 120 lies on LOR 125 connecting the detector positions at which the two gamma photons were received.

Event 130 is associated with a scatter coincidence because, even though the two gamma photons resulting from event 130 were detected within the coincidence time window, the position of annihilation event 130 does not lie on LOR 135 connecting the two photon positions. This may be due to Compton (i.e., inelastic) or Coherent (i.e., elastic) scatter resulting in a change of direction of at least one of the two gamma photons within object 110.

Events 140 and 142 are two separate annihilation events which result in detection of a random coincidence. As shown in FIG. 1B, one of the photons generated by event 140 is absorbed in object 110 and one of the photons generated by event 142 escaped detection by any detector 150 of scanner 100. The remaining photons happen to be detected within the coincidence time window, even though no annihilation event occurred on LOR 145 connecting the positions at which the coincident photons were received.

Since only the true unscattered coincidences indicate locations of annihilation events, random coincidences and scatter coincidences are often subtracted from or otherwise used to correct acquired PET data during reconstruction of a PET image.

As described herein, a direct axial plane is perpendicular to the axis of scanner 100. Accordingly, LORs 135 and 145 lie in direct axial planes of scanner 100 because their associated detectors 150 are within a same axial plane (i.e., within a same ring of the eight detector rings of scanner 100). In contrast, LOR 125 lies in an oblique plane because its two associated detectors 150 do not lie within a same detector ring of scanner 100. The oblique plane of LOR 125 may be considered a "low polar angle" plane due to the plane's small angular tilt from perpendicular to the axis of scanner 100.

Generally, a PET detector includes one or more scintillation elements and one or more electrical transducers. The scintillation elements create photons with the energy of a few electron volts in response to receiving the 511 keV photons which result from annihilation events. The electrical transducers convert the low-energy photons created by the scintillation elements to electrical signals. According to some embodiments, the electrical transducers may comprise, for example, silicon-based photomultipliers (SiPMs), photomultiplier tubes (PMTs), or semiconductor-based detectors.

FIG. 2 illustrates detector 200 according to some embodiments. Detector 200 consists of eight mini-blocks, with two mini-blocks in the axial direction and four mini-blocks in the transaxial direction. In one example, a mini-block comprises a grid of 5×5 lutetium oxyorthosilicate (LSO) scintillation crystals having dimensions of 3.2 mm×3.2 mm×20 mm. A mini-block may be coupled to a 4×4 array of SiPMs for receiving light photons therefrom and generating electrical signals based thereon. Detector 200 therefore includes 200 crystals, with rows of 10 crystals in the axial direction and 20 crystals in the transaxial direction. Embodiments are not limited to the above description of detector 200.

According to some embodiments, scanner 100 is a long axial field of view scanner including 32 detectors in the axial direction and 38 detectors in the transaxial direction. As such, scanner 100 includes 60800 detector crystals, with rows of 80 detector crystals in the axial direction and rows of 760 detector crystals in the transaxial direction. Embodiments are not limited to these specifications.

Figure 3:
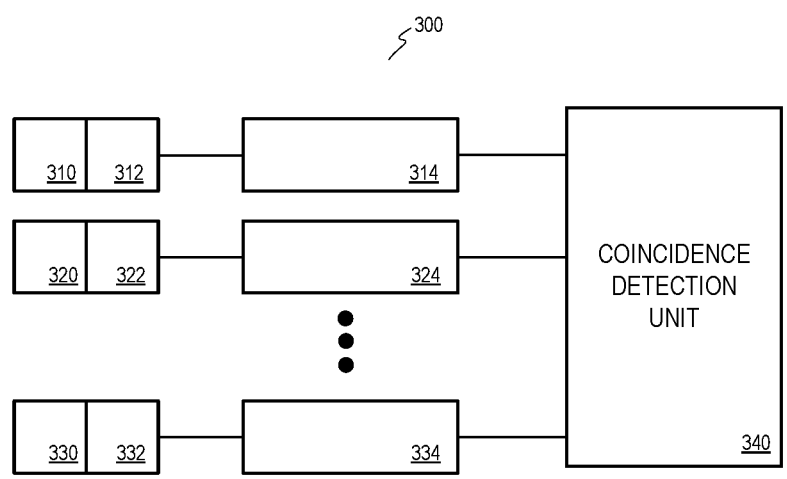
FIG. 3 is a block diagram of a coincidence detection system according to some embodiments.

FIG. 3 is a block diagram of coincidence detection system 300 according to some embodiments. System 300 includes scintillation units 310, 320 and 330, respective electrical transducer units 312, 322 and 332, and respective signal processing components 314, 324 and 334. Coincidence detection unit 340 receives signals from each of signal processing components 314, 324 and 334.

Each of scintillation units 310, 320 and 330 may include one or more scintillation crystals. For example, each of scintillation units 310, 320 and 330 may comprise a mini-block of 5×5 crystal elements, a macro-block of 2×2 mini-blocks, or a detector composed of two macro-blocks. Embodiments are not limited to any particular configuration or construction of scintillation units 310, 320 and 330.

Each of electrical transducer units 312, 322 and 332 may comprise one or more PMTs, SiPMs or the like. The number of electrical transducers in each of units 312, 322 and 332 may be less than, equal to, or greater than the number of crystal elements in each of scintillation units 310, 320 and 330. According to some embodiments, an electrical transducer unit includes one 4×4 array of SiPMs for each mini-block of 5×5 crystal elements in its corresponding scintillation unit.

Signal processing components 314, 324 and 334 receive electrical signals from respective electrical transducer units 312, 322 and 332 and perform signal processing to, for example, determine whether a signal represents a photon detection event, perform signal unpiling by pile-up rejection and/or correction methods, and associate photon detection events with specific detector crystals of scintillation units 310, 320 and 330. Signal processing components 314, 324 and 334 may perform any suitable functions and exhibit any suitable implementations.

Coincidence detection unit 340 receives all photon detection events which pass energy qualification, called singles, and identifies pairs of such events which occurred within a coincidence time window. Coincidence detection unit 340 may also include delay logic which delays the apparent arrival time of one event of each comparison, and then performs coincidence detection. As a result, the delay logic does not detect any actual true coincidences. The "delay coincidences" detected by the delay logic may be used to estimate mean random coincidences as will be described below.

Coincidence detection unit 340 outputs data specifying each identified pair of events and denoting each pair as a true coincidence or delay coincidence. For either type of coincidence, the output data also specifies the two detector crystals which received the photon detection events which comprised the coincidence. In the case of TOF PET imaging, the data of each detected coincidence also includes the difference between the arrival times of the two photons of the coincidence. This difference may be used to more accurately estimate a particular position along the LOR at which the corresponding annihilation event occurred.

A sinogram is a data array which stores the coincidences detected within a single plane over time. A delays sinogram may store data relating to the detected delay coincidences while a trues sinogram may store data relating to the detected true coincidences. A sinogram represents each LOR of each detected coincidence as an angle and a displacement from a center point lying on the scanner axis.

A sinogram includes one row containing the LOR for a particular azimuthal angle φ. Each of these rows corresponds to a one-dimensional parallel projection of the tracer distribution at a different coordinate. A sinogram stores the location of the LOR of each coincidence such that all the LORs passing through a single point in the volume trace a sinusoid curve in the sinogram. A TOF sinogram includes a third dimension specifying TOF information for each coincidence.

The plane represented by a sinogram may comprise a direct axial plane or an oblique plane. "2D" data refers to a set of sinograms of various direct axial planes, and may include data from low polar angle oblique planes. The latter data may be binned into sinograms of one or more existing direct axial planes and/or into sinograms of simulated direct axial planes as is known in the art. As is also known in the art, an image may be reconstructed solely from sinograms of direct axial planes, while ignoring the oblique planes.

Figure 4:
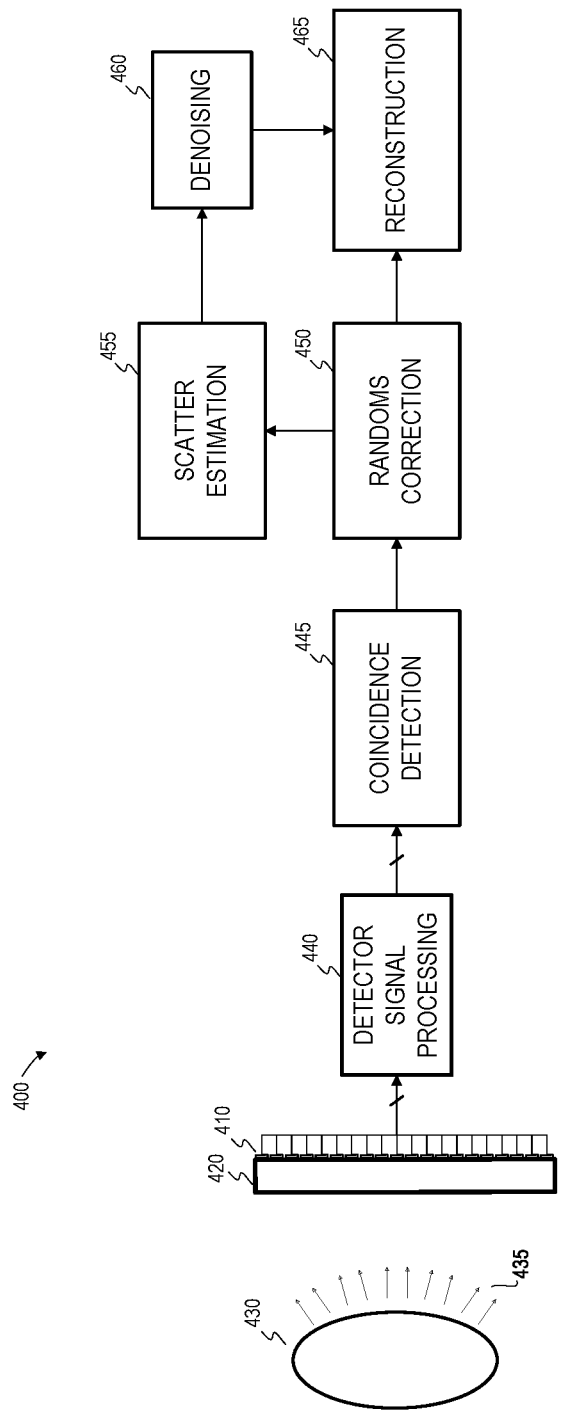
FIG. 4 is a block diagram of a system to reconstruct an image from PET data according to some embodiments.

FIG. 4 illustrates imaging system 400 according to some embodiments. Each component of system 400 may be implemented by any suitable combination of hardware and software. One or more components may be implemented by a single software application in some embodiments.

System 400 includes detectors 410 of a portion of a scanner and corresponding scintillator 420. Scintillator 420 may be comprised of individual crystals as described with respect to FIG. 2. Embodiments are not limited to scintillator-based detectors. Direct conversion detectors (e.g., CZT and TlBr) may also be used in conjunction with some embodiments.

Detectors 410 detect gamma photons 435 emitted from volume 430. Systems for facilitating the emission of gamma photons from a volume are known in the art, and in particular with respect to the PET imaging described herein. As described above, crystals of scintillator 420 receive the gamma photons 435 and emits light photons in response. Detectors 410 receive the light photons and each detector 410 generates electrical signals based on the energy of the received photons and its own characteristic photoelectric response profile.

Detector signal processing unit 440 receives the electrical signals generated by each detector 410 and performs signal processing to, for example, determine whether a signal represents a photon detection event, perform signal unpiling by pile-up rejection, determine an event energy, and determine an event time. Detector signal processing unit 440 may perform any suitable functions and exhibit any suitable implementations.

During a given time period, coincidence detection unit 445 receives all photon detection events which pass energy qualification (e.g., between 435 and 585 keV) from all detectors 410 of the scanner. Based on the reception time of each photon detection event, unit 445 identifies pairs of photon detection events which were received within a coincidence time window and determines that each such pair corresponds to a true coincidence having an associated LOR and energy. Coincidence detection unit 445 may also determine, for each pair of photon detection events, a TOF value representing a difference in the reception time of the photon detection events. Coincidence detection unit 445 also uses delay logic to identify delay coincidences as described above. For each plane, coincidence detection unit 445 stores a sinogram which represents each coincidence detected within the plane. These sinograms, representing direct axial and oblique planes, constitute 3D TOF data.

Randoms correction unit 450 may estimate mean random coincidences per crystal pair. For example, the delay coincidences may be used to estimate singles rates for each crystal of the PET scanner. The singles rate is the rate at which a crystal detects valid (i.e., energy-qualified) photons during the course of a scan. Next, for each crystal pair (i, j), mean randoms $\bar{r}_{ij}$ are estimated using the randoms smoothing model: $\bar{r}_{ij}=2\tau s_i s_j$, where $s_i$ and $s_j$ are the singles rate for crystals i and j and $\tau$ is the coincidence time window. Some techniques further apply rescaling to the estimated mean randoms $\bar{r}_{ij}$ based on the delay coincidence counts. The estimated mean randoms are used to correct the 3D TOF data such that the randoms-corrected 3D TOF data includes only net trues (i.e., scatter coincidences and unscattered true coincidences).

Scatter estimation unit 455 estimates 3D scatter based on the randoms-corrected 3D TOF data. As will be described in detail below, the estimation may include estimating residual 3D TOF scatter using 2D scatter estimation and using the residual 3D TOF scatter to estimate the 3D scatter within the randoms-corrected 3D TOF data.

In some embodiments, denoising unit 460 employs a Gaussian filter to smooth the estimated 3D scatter. According to other embodiments, the shape of the 3D scatter is modelled directly from the randoms-corrected 3D TOF data and denoising unit 460 scales this shape based on the estimated 3D scatter. Finally, reconstruction unit 465 executes a reconstruction algorithm to reconstruct an image based on the denoised estimated 3D scatter and on the randoms-corrected 3D TOF data output from randoms correction unit 450.

Figure 5:
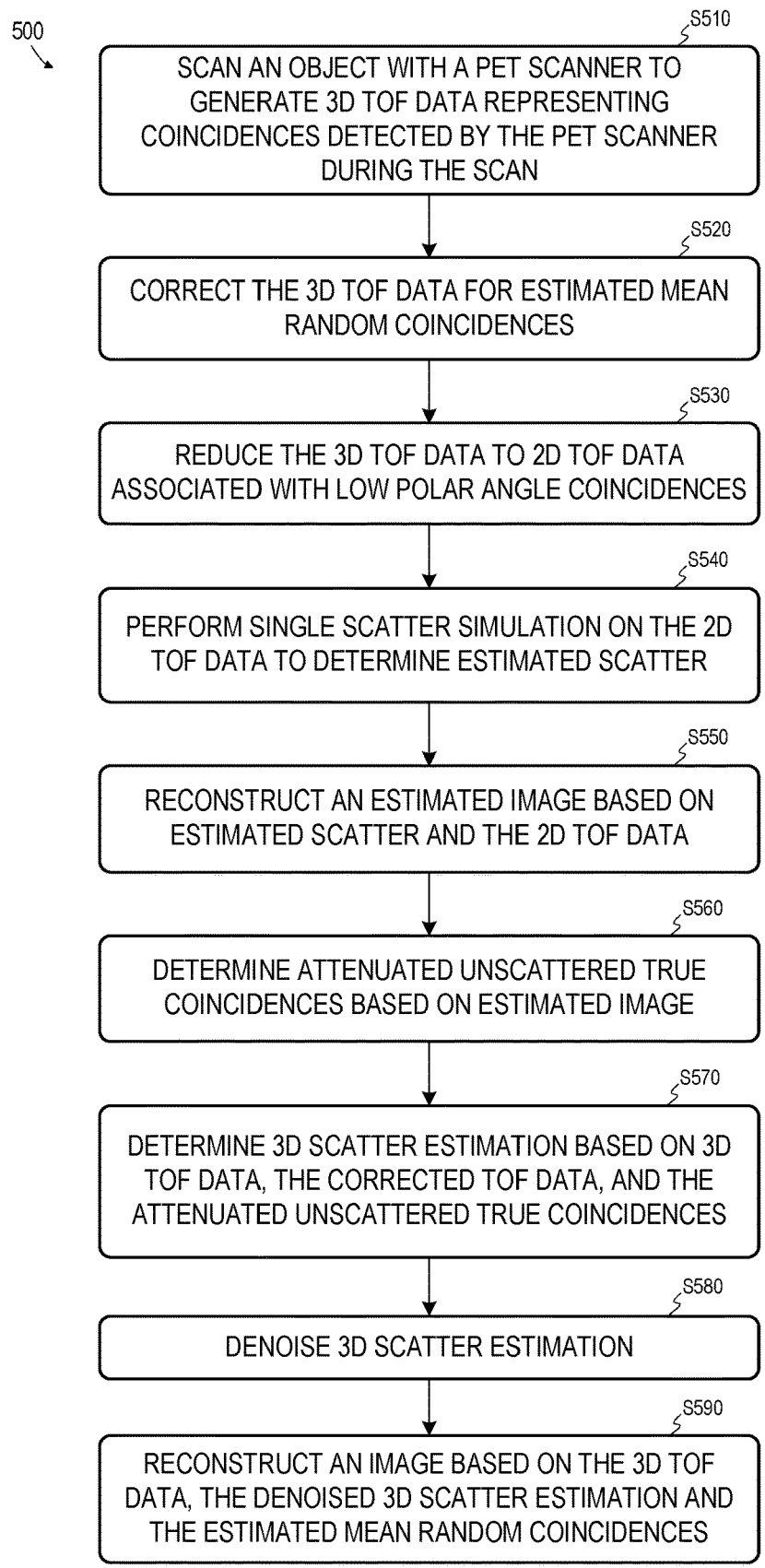
FIG. 5 comprises a flow diagram of a process to estimate scatter according to some embodiments.

FIG. 5 comprises a flow diagram of process 500 to estimate 3D scatter according to some embodiments. Process 500 and other processes described herein may be executed using any suitable combination of hardware and software. Software program code embodying these processes may be stored by any non-transitory tangible medium, including a fixed disk, a volatile or non-volatile random-access memory, a DVD, a Flash drive, and a magnetic tape, and executed by any suitable processing unit, including but not limited to one or more microprocessors, microcontrollers, processing cores, and processor threads. Embodiments are not limited to the examples described below.

Initially, at S510, an object is scanned using a PET scanner as is known in the art. According to some embodiments, the object comprises a phantom such as, for example, a uniform water-filled cylinder. A radionuclide tracer is injected into the object prior to the scan. The radionuclide tracer may comprise any suitable tracer, such as but not limited to fluorodeoxyglucose (FDG). The scan may comprise a conventional static PET scan or a CBM scan, and generates 3D TOF data describing delay coincidences and true coincidences detected by the PET scanner during the scan as described above.

Figure 6:
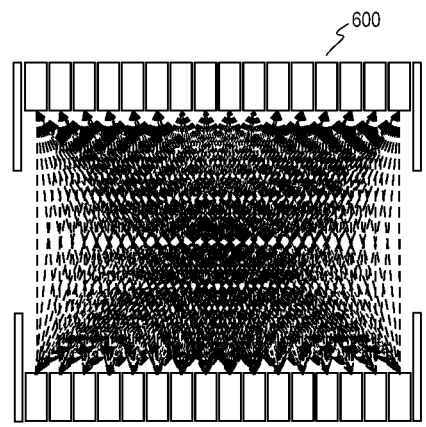
FIG. 6 illustrates LORs within a multi-ring PET scanner to some embodiments.

3D TOF data comprises sinograms of all planes which are acquired during a scan. FIG. 6 is a transaxial view of scanner 600 including sixteen coaxial rings of detectors. Dashed lines connect each "upper" detector to each one of the "lower" detectors. Each dashed line represents a plane of LORs which may be represented by a respective sinogram within the 3D TOF data.

The 3D TOF data is corrected for random coincidences at S520. Any suitable technique for estimating mean random coincidences and for correcting the 3D TOF data based on the estimate random coincidences may be employed at S520. According to some embodiments, an estimated mean randoms sinogram is generated for each plane of the 3D TOF data and the estimated mean randoms sinogram for a given plane is subtracted from the sinogram acquired for the given plane at S510. S520 results in 3D TOF data representing net trues (i.e., true coincidences and scatter coincidences).

Figure 7:
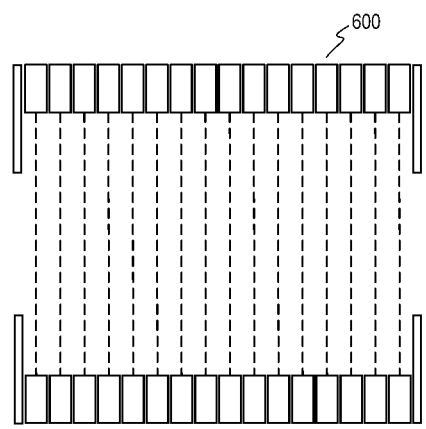
FIG. 7 illustrates 2D LORs within a multi-ring PET scanner to some embodiments.

The 3D TOF data is reduced to 2D TOF data at S530. FIG. 7 illustrates LORs of direct axial planes of scanner 600. In some embodiments, S530 includes extracting only the TOF data (i.e., sinograms) representing coincidences detected within the direct axial planes. Alternatively, FIG. 8 illustrates the direct axial planes of FIG. 7 along with oblique planes having a low polar angle (i.e., angle from vertical, in the axial direction).

Figure 8:
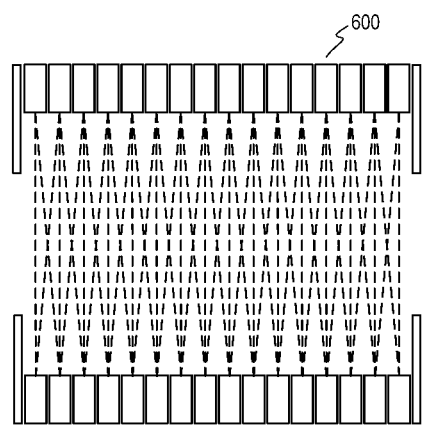
FIG. 8 illustrates low polar angle LORs within a multi-ring PET scanner to some embodiments.

S530 may comprise extracting TOF data representing coincidences detected within the direct axial planes and the oblique planes of FIG. 8. The oblique planes may be selected such that the geometric response does not change significantly from that of an adjacent direct segment while also retaining sufficient count statistics to achieve a reasonable scatter estimate. In this regard, the data of the oblique planes may be interpolated to construct sinograms of direct axial "inter-planes" as is known in the art, allowing the application of conventional 2D algorithms to the 2D TOF data produced at S530.

In this regard, 2D SSS is performed on the 2D TOF data at S540 to determine estimated scatter. Generally, according to one implementation of 2D SSS, an initial image is reconstructed from the 2D TOF data using corresponding attenuation correction factors (e.g., CT-derived) and normalization factors, and assuming no scatter. Scatter is estimated based on the initial image and the attenuation correction factors, and the image is reconstructed as in the first iteration but using the newly-estimated scatter. The process continues in this manner until the scatter estimate converges.

Next, at S550, an estimated image is reconstructed based on the scatter estimated at S540 and the randoms-corrected 2D TOF data. Any suitable TOF reconstruction algorithm may be used at S550, including but not limited to analytical approaches such as filtered backprojection (FBP) or discrete inverse fourier transform (DIFT) reconstruction, which produces "bias-free" images.

Attenuated unscattered true coincidences are determined based on the estimated image at S560. S560 may comprise forward-projecting the estimated image using a tomographic model (e.g., by computing the line integral) into a set of unscattered true coincidences for each of several tomographic planes. Each set may comprise a sinogram of unscattered true coincidences. This sinogram is then uncorrected for attenuation to generate the attenuated unscattered true coincidences.

A 3D scatter estimation is determined at S570 based on the original 3D TOF data generated at S520, the randoms-corrected TOF data (i.e., the net trues) generated at S520, and the attenuated unscattered true coincidences determined at S560. For example, the randoms-corrected TOF data is normalized per the normalization factors used to reconstruct the estimated image at S550. The attenuated unscattered true coincidences are then subtracted from the normalized randoms-corrected TOF data to produce the 3D scatter estimation.

The 3D scatter estimation is denoised at S580. Denoising may consist of applying a Gaussian filter to smooth the 3D scatter estimation as is known in the art. In some embodiments, denoising includes modelling the shape of the 3D scatter directly from the randoms-corrected 3D TOF data and scaling this shape, for each axial plane, based on the 3D scatter estimation determined at S570.

At S590, an image is reconstructed based on the original 3D TOF data, the denoised 3D scatter estimation, and the estimated mean random coincidences as is known in the art.

Figure 9:
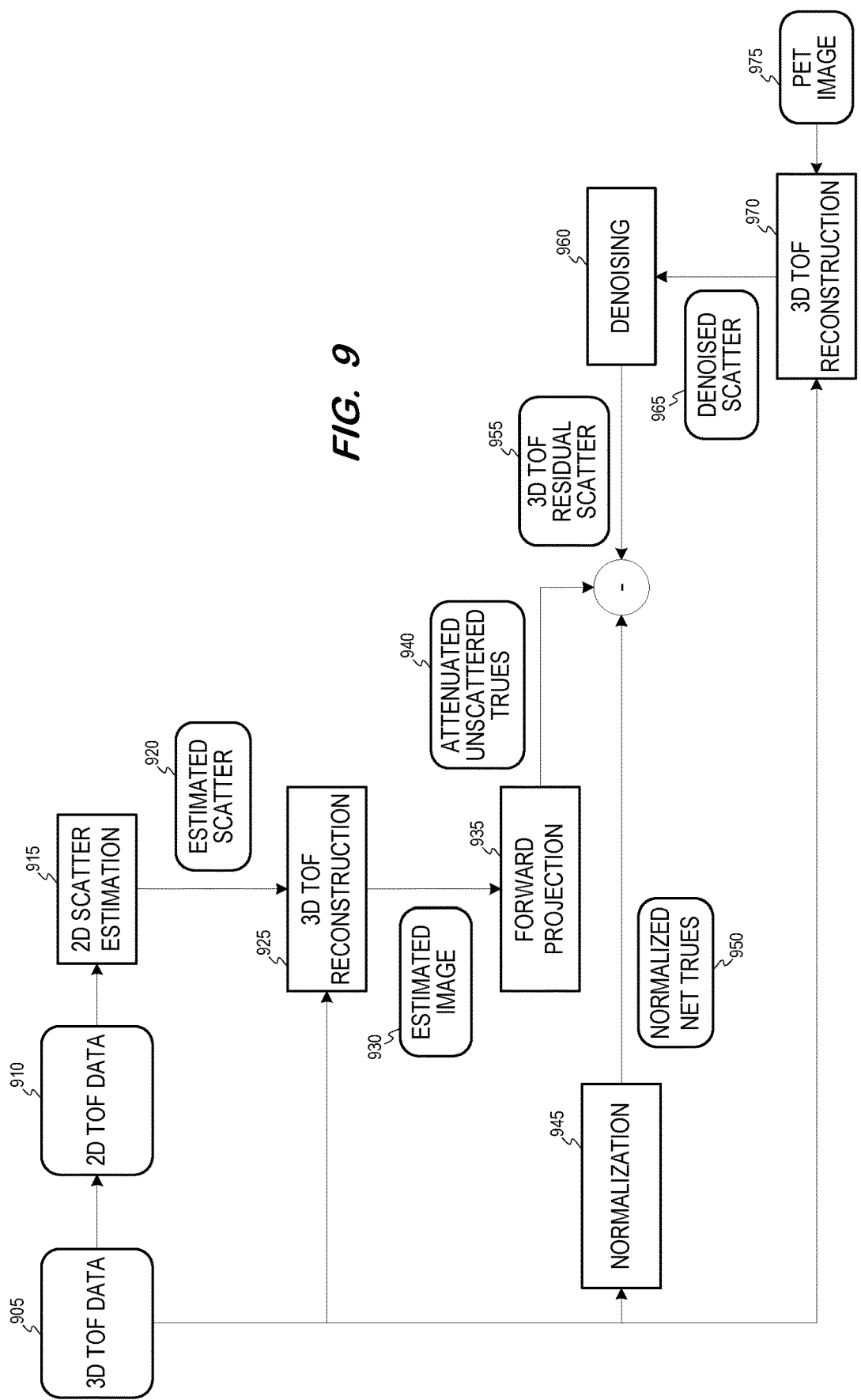
FIG. 9 is a block diagram of a system to reconstruct an image from 3D time-of-flight (TOF) PET data according to some embodiments.

FIG. 9 is a block diagram illustrating process 500 according to some embodiments. As shown, 2D TOF data 910 is acquired from 3D TOF data 905. For clarity, it will be assumed that 3D TOF data 905 is randoms-corrected and therefore 3D TOF data 905 and 2D TOF data 910 both represent net trues data.

2D scatter estimation 915 is performed using 2D TOF data 910 to generate estimated scatter 920. 3D TOF reconstruction 925 is applied to 3D TOF data 905 using estimated scatter 920 (and on appropriate attenuation and normalization factors) to generate estimated image 930. Estimated image 930 is then forward-projected 935 and uncorrected for attenuation to generate attenuated unscattered trues 940.

Normalization 945 is applied to 3D TOF data 905 to generate normalized net trues 950. 3D TOF residual scatter 955 is calculated as the difference between normalized net trues 950 and attenuated unscattered trues 940. 3D TOF residual scatter 955 is denoised 960 (e.g., using a Gaussian filter) and denoised scatter 965 is used to reconstruct 3D TOF data 905, resulting in PET image 975.

Figure 10:
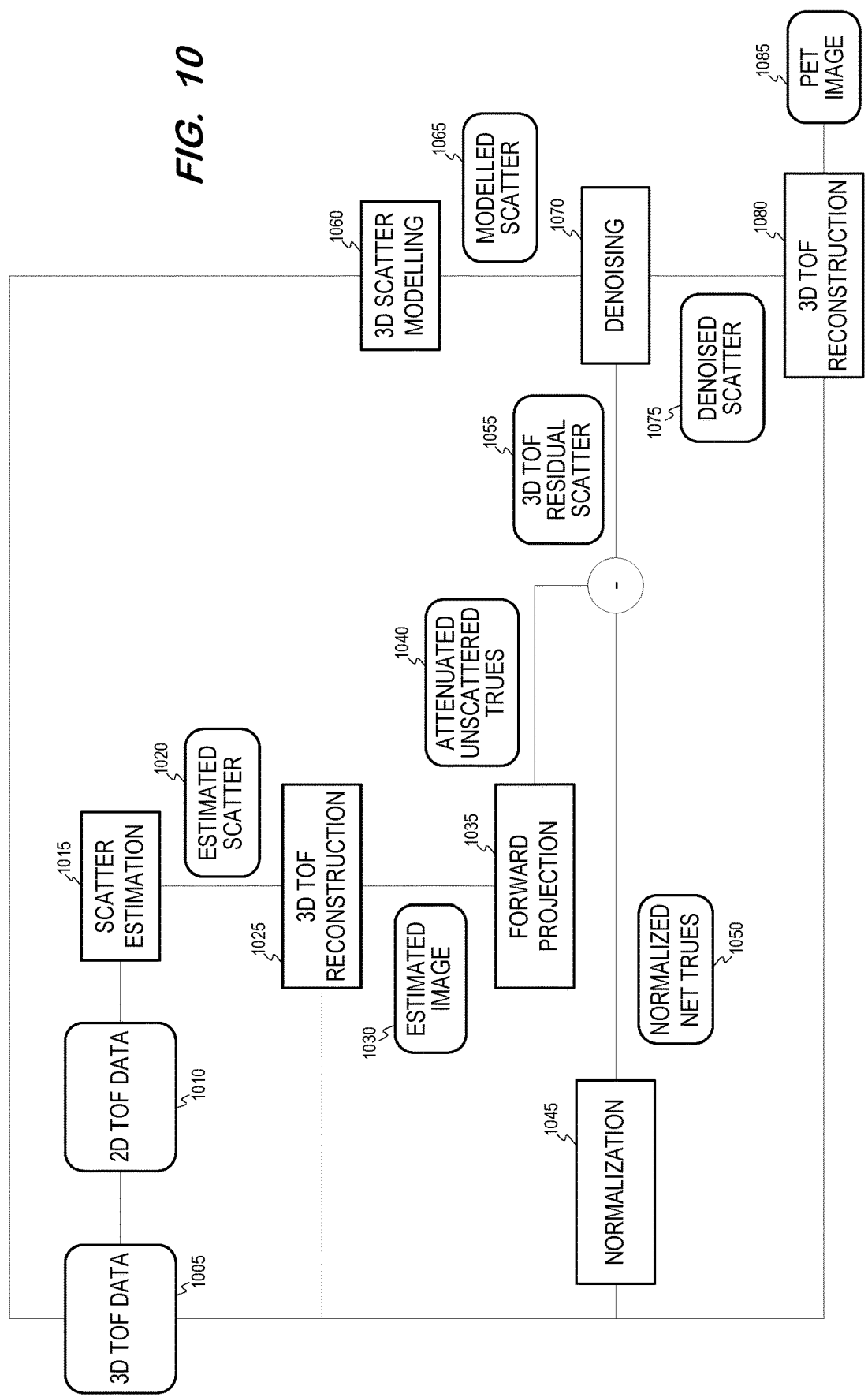
FIG. 10 is a block diagram of a system to reconstruct an image from 3D TOF PET data according to some embodiments.

FIG. 10 is a block diagram illustrating process 500 according to some embodiments. FIG. 10 is similar to FIG. 9 except for the use of 3D scatter modelling 1060 to generate modelled scatter 1065 based on 3D TOF data 1005. 3D TOF residual scatter 1055, generated as described above, is denoised 1070 by scaling (i.e., fitting) modelled scatter 1065 to 3D TOF residual scatter 1055 for each axial plane. Thusly-denoised scatter 1075 is then used to reconstruct 3D TOF data 1005, into PET image 1085.

Figure 11:
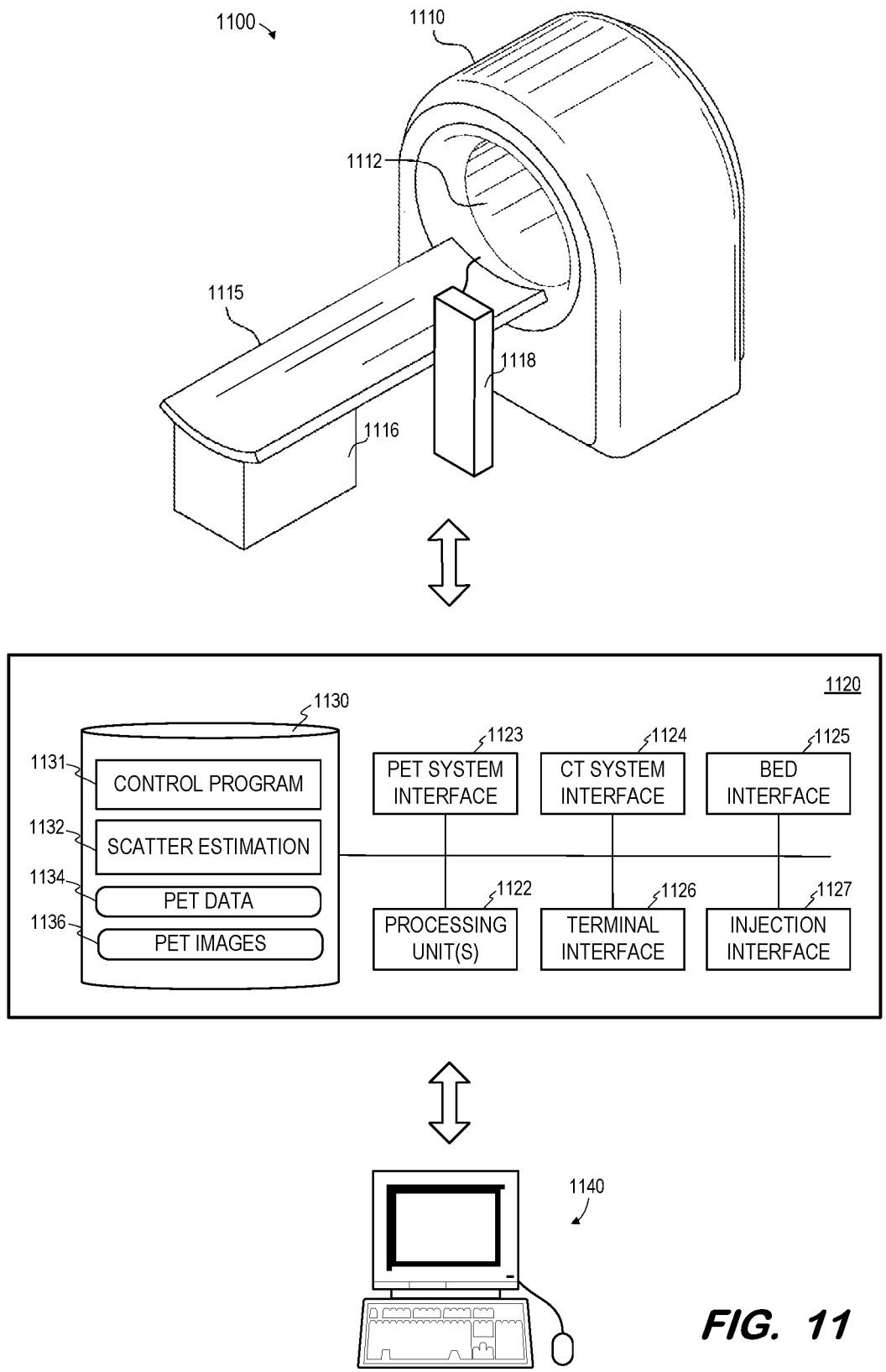
FIG. 11 is a block diagram of a PET/CT imaging system according to some embodiments.

FIG. 11 illustrates PET/CT system 1100 to execute one or more of the processes described herein. Embodiments are not limited to system 1100.

System 1100 includes gantry 1110 defining bore 1112. As is known in the art, gantry 1110 houses PET imaging components for acquiring PET image data and CT imaging components for acquiring CT image data. The CT imaging components may include one or more x-ray tubes and one or more corresponding x-ray detectors as is known in the art.

The PET imaging components may include any number or type of detectors in any configuration as is known in the art. Generally, a detector includes one or more scintillation elements and one or more electrical transducers. The scintillation elements create photons with the energy of few electron volts in response to receiving the 511 keV photons which result from annihilation events. LSO and lutetium yttrium oxyorthosilicate (LYSO) scintillators exhibit suitable stopping power and fast scintillation decay, and may be used in high count rate scenarios.

The electrical transducers convert the low-energy photons created by the scintillation elements to electrical signals. According to some embodiments, the electrical transducers may comprise SiPMs or photo-multiplier tubes PMTs. Some embodiments employ a block detector which includes more scintillation elements than electrical transducers. In a block detector, multiple electrical transducers receive spread-out low-energy photons resulting from absorption of one of the 511 keV annihilation-generated photons. The relative outputs of the transducers are compared in order to determine the absorption location, which in turn identifies the scintillation element, or crystal, which is determined to have received the annihilation photon.

Injection system 1118 may operate to deliver calibrated injections of FDG, iodine, or other radiopharmaceuticals to a patient before and/or during a PET scan. In some embodiments, injection system 1118 is incorporated into gantry 1110. Injection system 1118 may support a wired or wireless communications link with control system 1120 for receiving information specifying dosage, injection protocol and scan delay.

Bed 1115 and base 1116 are operable to move a patient lying on bed 1115 into and out of bore 1112 before, during and after imaging. In some embodiments, bed 1115 is configured to translate over base 1116 and, in other embodiments, base 1116 is movable along with or alternatively from bed 1115.

Movement of a patient into and out of bore 1112 may allow scanning of the patient using the CT imaging elements and the PET imaging elements of gantry 1110. Such scanning may proceed based on scanning parameters such as scan ranges and corresponding scanning speeds. Bed 1115 and base 1116 may provide continuous bed motion and/or step-and-shoot motion during such scanning according to some embodiments.

Control system 1120 may comprise any general-purpose or dedicated computing system. Accordingly, control system 1120 includes one or more processing units 1122 configured to execute processor-executable program code to cause system 1120 to operate as described herein, and storage device 1130 for storing the program code. Storage device 1130 may comprise one or more fixed disks, solid-state random-access memory, and/or removable media (e.g., a thumb drive) mounted in a corresponding interface (e.g., a USB port).

Storage device 1130 stores program code of control program 1131. One or more processing units 1122 may execute control program 1131 to, in conjunction with PET system interface 1123, bed interface 1125, and injection interface 1127, control hardware elements to inject a radiopharmaceutical into a patient, move the patient into bore 1112 past PET detectors of gantry 1110, and detect coincidence events occurring within the patient. The detected events may be stored in memory 1130 as PET data 1134.

One or more processing units 1122 may also execute control program 1131 to, in conjunction with CT system interface 1124, cause a radiation source within gantry 1110 to emit radiation toward a body within bore 1112 from different projection angles, and to control a corresponding detector to acquire two-dimensional CT data. The CT data may be acquired substantially contemporaneously with the PET data as described above, and may be used for attenuation correction of contemporaneously-acquired PET data 1134 as is known in the art.

Storage device 1130 also includes scatter estimation program 1132 which may be executed for estimating 3D scatter as described in detail above. Control program 1131 may also be executed to reconstruct PET data 1134 into PET images 1136 based on the estimated 3D scatter using any reconstruction algorithm that is or becomes known.

PET images 1136 may be transmitted via terminal interface 1126 to terminal 1140 for display. Terminal 1140 may comprise a display device and an input device coupled to system 1120. Terminal 1140 may receive user input for controlling display of the data, operation of system 1100, and/or the processing described herein. In some embodiments, terminal 1140 is a separate computing device such as, but not limited to, a desktop computer, a laptop computer, a tablet computer, and a smartphone.

Each component of system 1100 may include other elements which are necessary for the operation thereof, as well as additional elements for providing functions other than those described herein. Each functional component described herein may be implemented in computer hardware, in program code and/or in one or more computing systems executing such program code as is known in the art. Such a computing system may include one or more processing units which execute processor-executable program code stored in a memory system.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a positron emission tomography scanner to perform a scan of an object and generate first time-of-flight (TOF) data describing true coincidences detected within direct axial planes and oblique planes during the scan; and
   a processing unit to:
   determine second TOF data from the first TOF data, the second TOF data describing the true coincidences detected within the direct axial planes during the scan and true coincidences detected within a subset of the oblique planes during the scan;
   determine first estimated scatter based on the second TOF data;
   reconstruct a first estimated image based on the first estimated scatter and the second TOF data;
   determine attenuated unscattered true coincidences based on the first estimated image;
   determine second estimated scatter based on the first TOF data and the attenuated unscattered true coincidences; and
   reconstruct an image of the object based on the first TOF data and the second estimated scatter.

2. A system according to claim 1, wherein the subset of the oblique planes comprise oblique planes associated with a low polar angle.

3. A system according to claim 1, wherein determination of the first estimated scatter comprises application of a 2D Single Scatter Simulation algorithm to the second TOF data.

4. A system according to claim 1, the processing unit to:
   determine estimated mean random coincidences associated with the first TOF data,
   wherein determination of the second estimated scatter comprises correcting the first TOF data based on the estimated mean random coincidences and normalizing the corrected first TOF data to generate normalized net true coincidences, uncorrecting the unscattered true coincidences for attenuation to generate attenuated unscattered true coincidences, and subtracting the attenuated unscattered true coincidences from the normalized net true coincidences, and wherein reconstruction of the image of the object is based on the first TOF data, the estimated mean random coincidences and the second estimated scatter.

5. A system according to claim 1, the processing unit to: denoise the second estimated scatter, wherein reconstruction of the image of the object is based on the first TOF data and the denoised second estimated scatter.

6. A system according to claim 5, wherein denoising of the second estimated scatter comprises:

determination of third estimated scatter based on the first TOF data, and scaling of the third estimated scatter based on the second estimated scatter.

7. A system according to claim 6, wherein determination of third estimated scatter based on the first TOF data comprises application of a 3D Single Scatter Simulation algorithm to the first TOF data.

8. A method comprising:

acquiring first time-of-flight (TOF) data describing true coincidences detected within direct axial planes and oblique planes during a scan of an object;

determining second TOF data from the first TOF data, the second TOF data describing the true coincidences detected only within the direct axial planes and within a subset of the oblique planes, each oblique plane of the subset associated with a low polar angle;

determining first estimated scatter based on the second TOF data;

reconstructing a first estimated image based on the first estimated scatter and the second TOF data;

determining attenuated unscattered true coincidences based on the first estimated image;

determining second estimated scatter based on the first TOF data and the attenuated unscattered true coincidences; and reconstructing an image of the object based on the first TOF data and the second estimated scatter.

9. A method according to claim 8, wherein determining the first estimated scatter comprises applying a 2D Single Scatter Simulation algorithm to the second TOF data.

10. A method according to claim 8, further comprising:

determining estimated mean random coincidences associated with the first TOF data, wherein determining the second estimated scatter comprises correcting the first TOF data based on the estimated mean random coincidences and normalizing the corrected first TOF data to generate normalized net true coincidences, uncorrecting the unscattered true coincidences for attenuation to generate attenuated unscattered true coincidences, and subtracting the attenuated unscattered true coincidences from the normalized net true coincidences, and wherein reconstructing the image of the object is based on the first TOF data, the estimated mean random coincidences and the second estimated scatter.

11. A method according to claim 8, further comprising: denoising the second estimated scatter, wherein reconstructing the image of the object is based on the first TOF data and the denoised second estimated scatter.

12. A method according to claim 11, wherein denoising the second estimated scatter comprises:

determining third estimated scatter based on the first TOF data, and scaling the third estimated scatter based on the second estimated scatter.

13. A method according to claim 12, wherein determining third estimated scatter based on the first TOF data comprises applying a 3D Single Scatter Simulation algorithm to the first TOF data.

14. A non-transitory computer-readable medium storing processor-executable process steps which when executed by a processing unit of a computing system, cause the computing system to:

acquire first time-of-flight (TOF) data describing true coincidences detected within direct axial planes and oblique planes during a scan of an object;

determine second TOF data from the first TOF data, the second TOF data describing the true coincidences detected only within the direct axial planes and within a subset of the oblique planes, each oblique plane of the subset associated with a low polar angle;

determine first estimated scatter based on the second TOF data;

reconstruct a first estimated image based on the first estimated scatter and the second TOF data;

determine attenuated unscattered true coincidences based on the first estimated image;

determine second estimated scatter based on the first TOF data and the attenuated unscattered true coincidences; and reconstruct an image of the object based on the first TOF data and the second estimated scatter.

15. A medium according to claim 14, wherein determination of the first estimated scatter comprises applying a 2D Single Scatter Simulation algorithm to the second TOF data.

16. A medium according to claim 14, the processor-executable process steps which when executed by a processing unit of a computing system, cause the computing system to:

determine estimated mean random coincidences associated with the first TOF data, wherein determination of the second estimated scatter comprises correcting the first TOF data based on the estimated mean random coincidences and normalizing the corrected first TOF data to generate normalized net true coincidences, uncorrecting the unscattered true coincidences for attenuation to generate attenuated unscattered true coincidences, and subtracting the attenuated unscattered true coincidences from the normalized net true coincidences, and wherein reconstruction of the image of the object is based on the first TOF data, the estimated mean random coincidences and the second estimated scatter.

17. A medium according to claim 14, the processor-executable process steps which when executed by a processing unit of a computing system, cause the computing system to:

denoise the second estimated scatter, wherein reconstruction of the image of the object is based on the first TOF data and the denoised second estimated scatter.

18. A medium according to claim 17, wherein denoising of the second estimated scatter comprises:

determination of third estimated scatter based on the first TOF data, and scaling of the third estimated scatter based on the second estimated scatter.

19. A medium according to claim 18, wherein determination of third estimated scatter based on the first TOF data comprises application of a 3D Single Scatter Simulation algorithm to the first TOF data.

* * * * *